(12) United States Patent
Shigeta

(10) Patent No.: US 8,935,501 B2
(45) Date of Patent: Jan. 13, 2015

(54) APPARATUS, METHOD, AND RECORDING MEDIUM STORING A PROGRAM FOR SELECTING A DESTINATION STORAGE BASED ON A BUFFER SIZE

(75) Inventor: Soichi Shigeta, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 13/546,669

(22) Filed: Jul. 11, 2012

(65) Prior Publication Data

US 2013/0080699 A1    Mar. 28, 2013

(30) Foreign Application Priority Data

Sep. 26, 2011  (JP) ................. 2011-209013

(51) Int. Cl.
*G06F 12/00*   (2006.01)
*G06F 3/06*    (2006.01)

(52) U.S. Cl.
CPC ........................ *G06F 3/06* (2013.01)
USPC ............................. 711/165; 711/170; 710/52

(58) Field of Classification Search
USPC ................... 711/165, 170; 710/52
See application file for complete search history.

(56) References Cited

U.S. PATENT DOCUMENTS

| | | | |
|---|---|---|---|
| 7,949,847 B2 * | 5/2011 | Murase | 711/170 |
| 2004/0039891 A1 * | 2/2004 | Leung et al. | 711/165 |
| 2005/0160135 A1 | 7/2005 | Yokoro | |
| 2005/0198292 A1 | 9/2005 | Duursma et al. | |

FOREIGN PATENT DOCUMENTS

JP          2005-202631      7/2005

* cited by examiner

*Primary Examiner* — Kalpit Parikh
(74) *Attorney, Agent, or Firm* — Staas & Halsey LLP

(57) ABSTRACT

A control method includes allocating a plurality of virtual disks to a virtual storage allocated to a physical storage, associating data with one of the plurality of virtual disks which has been instructed to store the data and storing the data in the physical storage, and selecting, by a processor, one of the plurality of virtual disks as a data movement target virtual disk from which data is to be moved in accordance with a network bandwidth of the physical storage corresponding to the virtual storage when free space in the virtual storage exceeds a threshold value.

12 Claims, 18 Drawing Sheets

| STORAGE APPARATUS ID | MODEL NAME | IP ADDRESS | STATE |
|---|---|---|---|
| PSU-001 | XX-100A | 192.168.1.23 | NORMAL |
| PSU-002 | XX-300S | 192.168.2.34 | NORMAL |
|  |  |  |  |
|  |  |  |  |

| VIRTUAL DISK ID | VIRTUAL STORAGE ID | CAPACITY | THE AMOUNT OF PRACTICAL USE | HISTORY 1 | | ... | HISTORY n | |
|---|---|---|---|---|---|---|---|---|
| | | | | THE AMOUNT OF INCREASE | NUMBER OF WRITTEN PAGE | | THE AMOUNT OF INCREASE | NUMBER OF WRITTEN PAGE |
| VDISK_00001 | VS-001 | 500GB | 2GB | 450MB | [0,1,2,3,4,5,10] | | 20MB | [10,15,16] |
| VDISK_00234 | VS-001 | 1TB | 700GB | 0MB | [ ] | | 0MB | [ ] |
| VDISK_12345 | VS-002 | 300GB | 80GB | 30MB | [67,68] | | 65MB | [81,82,83] |
| VDISK_06463 | VS-001 | 500GB | 320GB | 10MB | [184] | | 10MB | [184] |
| VDISK_66845 | VS-003 | 750GB | 150GB | -20MB | [ ] | | -15MB | [ ] |

| DISK SIZE | MAXIMUM PERMISSIBLE TIME |
|---|---|
| 1TB | 48 HOURS |
| 500GB | 24 HOURS |
| 100GB | 5 HOURS |
| 50GB | 2.5 HOURS |
| 10GB | 25 MINUTES |
| 1GB | 2 MINUTES |

| STORAGE APPARATUS ID | BANDWIDTH (OUTPUT) | FIRST HISTORY | SECOND HISTORY | THIRD HISTORY | ... | nTH HISTORY |
|---|---|---|---|---|---|---|
| PSU-001 | MAXIMUM VALUE (Mbps) | 86.5 | 98.0 | 84.2 | | 42.3 |
| | MEDIAN VALUE (Mbps) | 70.8 | 73.4 | 74.7 | | 32.0 |
| | MINIMUM VALUE (Mbps) | 55.0 | 48.8 | 65.1 | | 21.7 |
| PSU-001 | MAXIMUM VALUE (Mbps) | 35.2 | 40.6 | 52.1 | | 66.2 |
| | MEDIAN VALUE (Mbps) | 27.6 | 31.4 | 40.5 | | 58.3 |
| | MINIMUM VALUE (Mbps) | 20.0 | 22.1 | 28.8 | | 50.4 |

| VIRTUAL STORAGE ID 512 | STORAGE APPARATUS ID 531 | ACTUAL MAXIMUM CAPACITY 563 | PERMISSIBLE AMOUNT OF OVERCOMMITMENT 564 | RESERVED CAPACITY 565 | FREE SPACE 566 | THE AMOUNT OF PRACTICAL USE 514 | ACTUAL FREE SPACE 568 |
|---|---|---|---|---|---|---|---|
| VS-001 | PSU-001 | 15TB | 5TB | 18TB | 2TB | 6TB | 9TB |
| VS-002 | PSU-001 | 30TB | 10TB | 22TB | 18TB | 10TB | 20TB |
| ... | | | | | | | |

| VIRTUAL STORAGE ID | ACTUAL FREE SPACE THRESHOLD VALUE |
|---|---|
| VS-001 | 20% (3TB) |
| VS-002 | 25% (7.5TB) |
| | |
| | |

FIG. 17

| VM GUEST ID 541 | IP ADDRESS 642 | CPU 543 | MEMORY 544 | STATE 545 | VM HOST ID 546 | USED VIRTUAL DISK 547 |
|---|---|---|---|---|---|---|
| VM001 | 192.168.129.11 | 1.0GHz | 4GB | NORMAL | VH-001 | VDISK-00001,VDISK-06463 |
| VM002 | 192.168.129.12 | 2.0GHz | 2GB | NORMAL | VH-001 | VDISK-00234 |

| VM HOST ID 546 | IP ADDRESS 742 | CPU 643 | MEMORY 644 | STATE 645 | USED VIRTUAL STORAGE 586 | VM GUEST 587 |
|---|---|---|---|---|---|---|
| VH-001 | 192.168.1.10 | 3.0GHz x 4 | 16GB | NORMAL | VS-001, VS-123 | VM001, VM002, VM003 |
| VH-002 | 192.168.2.21 | 2.0GHz x 2 | 8GB | NORMAL | VS-002 | VM101, VM102 |

580

APPARATUS, METHOD, AND RECORDING MEDIUM STORING A PROGRAM FOR SELECTING A DESTINATION STORAGE BASED ON A BUFFER SIZE

CROSS-REFERENCE TO RELATED APPLICATION

This application is based upon and claims the benefit of priority of the prior Japanese Patent Application No. 2011-209013, filed on Sep. 26, 2011, the entire contents of which are incorporated herein by reference.

FIELD

The embodiment discussed herein is related to an information processing apparatus control method, a control program, and an information processing apparatus.

BACKGROUND

When a physical storage apparatus is provided on the basis of a capacity contracted by a user, a technique for virtualizing a physical storage apparatus and providing a disk with a capacity demanded by a user as a virtual disk is used. A user usually creates a virtual disk with an extra capacity.

Thick provisioning is a method of fully allocating a disk capacity demanded by a user to a virtual disk at the time of creation of the virtual disk. Since a demanded capacity is fully allocated to a virtual disk regardless of whether the capacity is to be used, a user's demand for a capacity exceeding the physical capacity of a storage apparatus is not received. On the other hand, thin provisioning is a technique for dynamically allocating a capacity to a virtual disk on the basis of the size of data to be actually written without fully allocating a disk capacity demanded by a user to the virtual disk at the time of creation of the virtual disk. With the thin provisioning technique, an extra capacity that is set by a user but may remain unused is not allocated. Accordingly, a demand from another user who plans to actually use a capacity is received, and a demand for a capacity exceeding the physical capacity of a storage apparatus is received from a user (overcommitment).

There is a migration technique for monitoring the user's use of a virtual disk and moving the virtual disk in a physical disk to another physical disk when it is determined that it is difficult to provide a capacity contracted by a user with the current physical disk. With the migration technique, data in the virtual disk is copied and the copied data is stored in a new virtual disk created in another virtual storage. At that time, the user accesses the new virtual disk with an identifier assigned to the original virtual disk. Methods of selecting a migration target virtual disk with the migration technique include a method of selecting a virtual disk whose amount of practical use is the maximum and a method of selecting a virtual disk whose amount of practical use is small but the increase in the amount of practical use is the maximum.

In a case where a virtual disk creation request is received from a user, a virtual disk is generally created in a virtual storage having the maximum free space. Although it is determined that there is sufficient free space in a virtual storage at the time of creation of a virtual disk, the shortage of free space may occur in accordance with an operational state. In this case, when overcommitment is performed, the migration of some virtual disks to another virtual storage is performed to ensure a disk capacity committed for a user. By performing the migration of a virtual disk whose amount of practical use is large from a virtual storage, large free space is obtained in the virtual storage. However, since data in the virtual disk has to be copied, the migration of the virtual disk takes a lot of time.

In a case where free space in a virtual storage is reduced, the amount of overcommitment has to be reduced to ensure a virtual disk size committed for a user (the amount of overcommitment has to be set to zero when there is no free space in a physical disk). By performing the migration of a virtual disk whose amount of practical use is large, both the acquirement of free space in the virtual storage and the reduction in the amount of overcommitment is achieved. However, in the migration of a virtual disk whose amount of practical use is large, large amounts of data have to be copied. In order to complete the migration within a short time, a large network bandwidth has to be used.

Examples of the related art include Japanese National Publication of International Patent Application No. 2002-533830 and Japanese Laid-open Patent Publication No. 2005-202631.

SUMMARY

According to an aspect of the embodiment, a control method includes allocating a plurality of virtual disks to a virtual storage allocated to a physical storage, associating data with one of the plurality of virtual disks which has been instructed to store the data and storing the data in the physical storage, and selecting, by a processor, one of the plurality of virtual disks as a data movement target virtual disk from which data is to be moved in accordance with a network bandwidth of the physical storage corresponding to the virtual storage when free space in the virtual storage exceeds a threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a storage resource management table;

FIG. 9 is a diagram illustrating a virtual disk management table;

FIG. 10 is a diagram illustrating a maximum permissible time management table;

FIG. 11 is a diagram illustrating a bandwidth record table;

FIG. 12 is a diagram illustrating a virtual storage management table;

FIG. 13 is a diagram illustrating a threshold value table;

FIG. 17 is a diagram illustrating a VM guest management table; and

FIG. 18 is a diagram illustrating a VM host management table.

DESCRIPTION OF EMBODIMENT

An information processing system according to an embodiment will be described with reference to FIG. 1. An information processing system includes a plurality of servers 100, an information processing apparatus 200, and a plurality of storage apparatuses 400. The servers 100 execute a Virtual Machine (VM). The information processing apparatus 200 manages the storage apparatuses 400. The storage apparatuses 400 store data.

Figure 2:
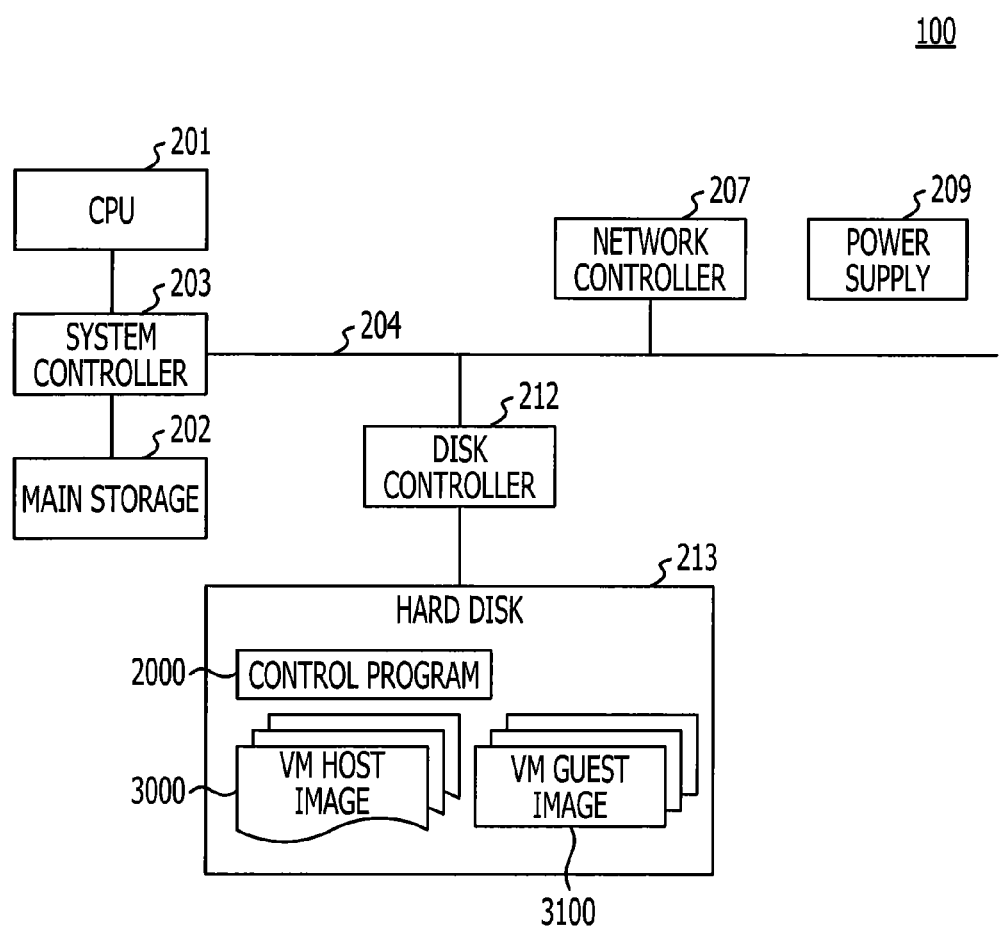
FIG. 2 is a diagram illustrating a server.

The server 100 according to an embodiment will be described with reference to FIG. 2. The server 100 includes a Central Processing Unit (CPU) 201, a main storage 202, a system controller 203, a bus 204, a network controller 207, a power supply 209, a disk controller 212, and a hard disk 213. The server 100 is controlled by the CPU 201.

The system controller 203 is coupled to the CPU 201 and the main storage 202. The system controller 203 controls the data transfer between the CPU 201 and the main storage 202 and the data transfer between the CPU 201 and the bus 204. The network controller 207 and the disk controller 212 are coupled to the system controller 203 via the bus 204.

A program for an Operating System (OS) and at least a part of an application program which are to be executed by the CPU 201 are temporarily stored in the main storage 202. Various pieces of data used for processing performed by the CPU 201 are stored in the main storage 202. The main storage 202 is, for example, a Random Access Memory (RAM).

The hard disk 213 is coupled to the disk controller 212.

The hard disk 213 stores a VM host image 3000 which the CPU 201 uses to execute a VM host in the main storage 202, a VM guest image 3100 which the CPU 201 uses to execute a VM guest in the main storage 202, a control program 2000 with which the CPU 201 controls, for example, the reading of the VM host image 3000, and various pieces of data.

Figure 1:
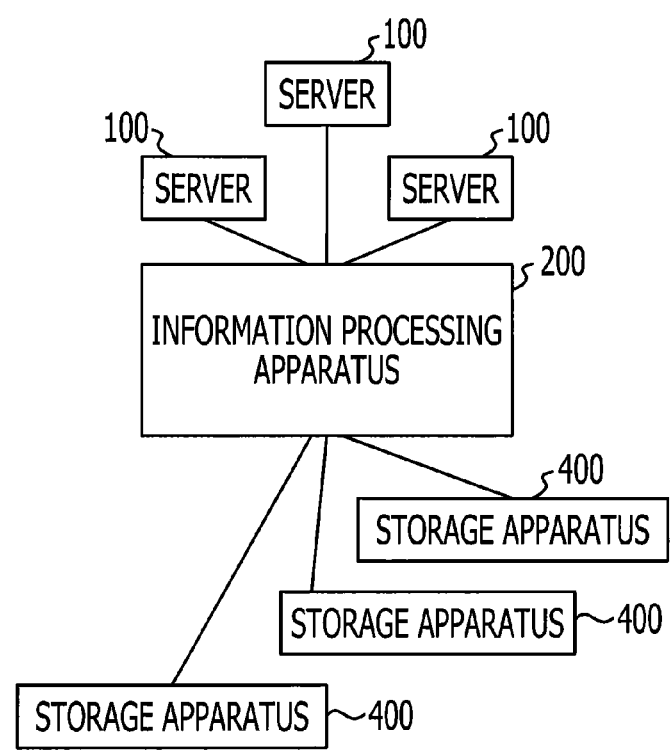
FIG. 1 is a diagram illustrating an information processing system.

The network controller 207 is coupled to the servers 100, the information processing apparatus 200, and the storage apparatuses 400, which are illustrated in FIG. 1, and transmits and receives data to and from each of the servers 100, the information processing apparatus 200, and the storage apparatuses 400.

The power supply 209 supplies power to each piece of hardware in the server 100 via a power line (not illustrated).

The processing function of the server 100 is performed with these pieces of hardware.

Figure 3:
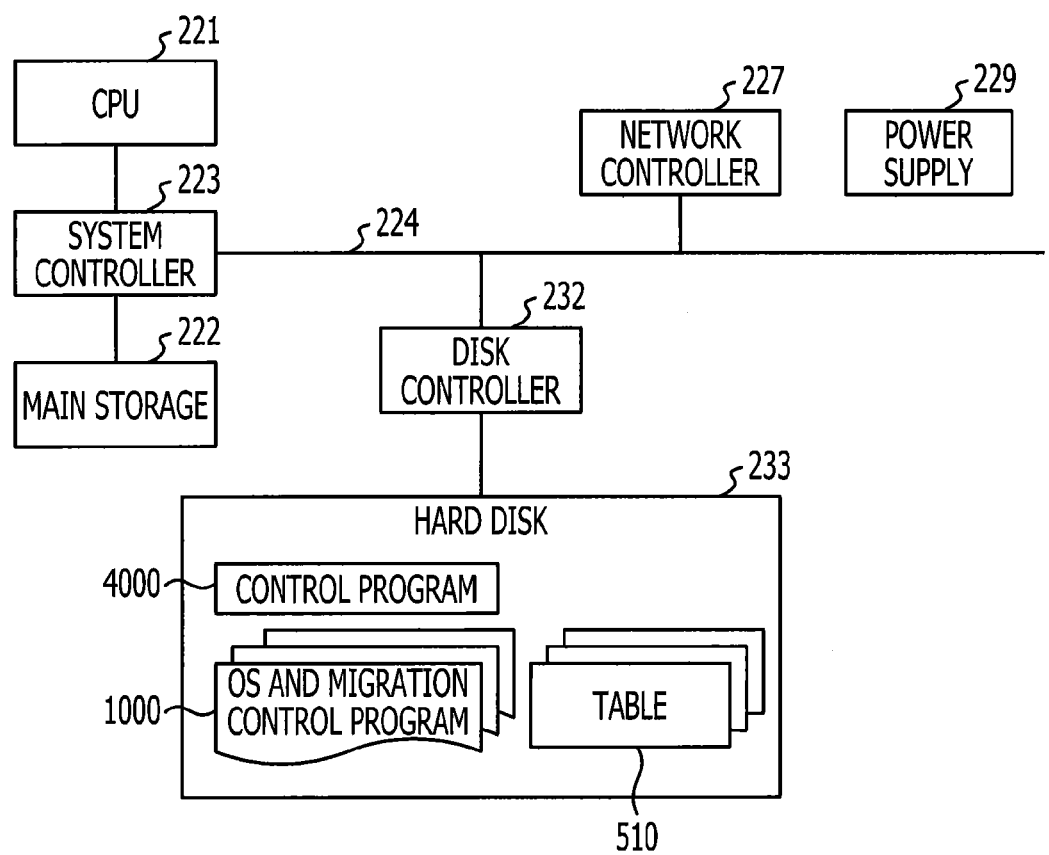
FIG. 3 is a diagram illustrating an information processing apparatus.

The information processing apparatus 200 according to an embodiment will be described with reference to FIG. 3. The information processing apparatus 200 includes a CPU 221, a main storage 222, a system controller 223, a bus 224, a network controller 227, a power supply 229, a disk controller 232, and a hard disk 233. The information processing apparatus 200 is controlled by the CPU 221.

The system controller 223 is coupled to the CPU 221 and the main storage 222. The system controller 223 controls the data transfer between the CPU 221 and the main storage 222 and the data transfer between the CPU 221 and the bus 224. The network controller 227 and the disk controller 232 are coupled to the system controller 223 via the bus 224.

A program for an OS and at least a part of an application program which are to be executed by the CPU 221 are temporarily stored in the main storage 222. Various pieces of data used for processing performed by the CPU 221 are stored in the main storage 222. The main storage 222 is, for example, a RAM.

The hard disk 233 is coupled to the disk controller 232. The disk controller 232 controls the hard disk 233.

The hard disk 233 stores an OS and a migration control program 1000 which the CPU 221 executes in the main storage 222, a control program 4000 with which the CPU 221 controls the reading of the OS and the OS and migration control program 1000, and pieces of various data. The hard disk 233 stores various tables including a virtual disk management table 510 and a storage resource management table 550. The virtual disk management table 510 will be described later.

The network controller 227 is coupled to the servers 100 and the storage apparatuses 400, which are illustrated in FIG. 1, and transmits and receives data to and from each of the servers 100 and the storage apparatuses 400.

The power supply 229 supplies power to each piece of hardware in the information processing apparatus 200 via a power line (not illustrated).

The processing function of the information processing apparatus 200 is performed with these pieces of hardware.

Figure 4:
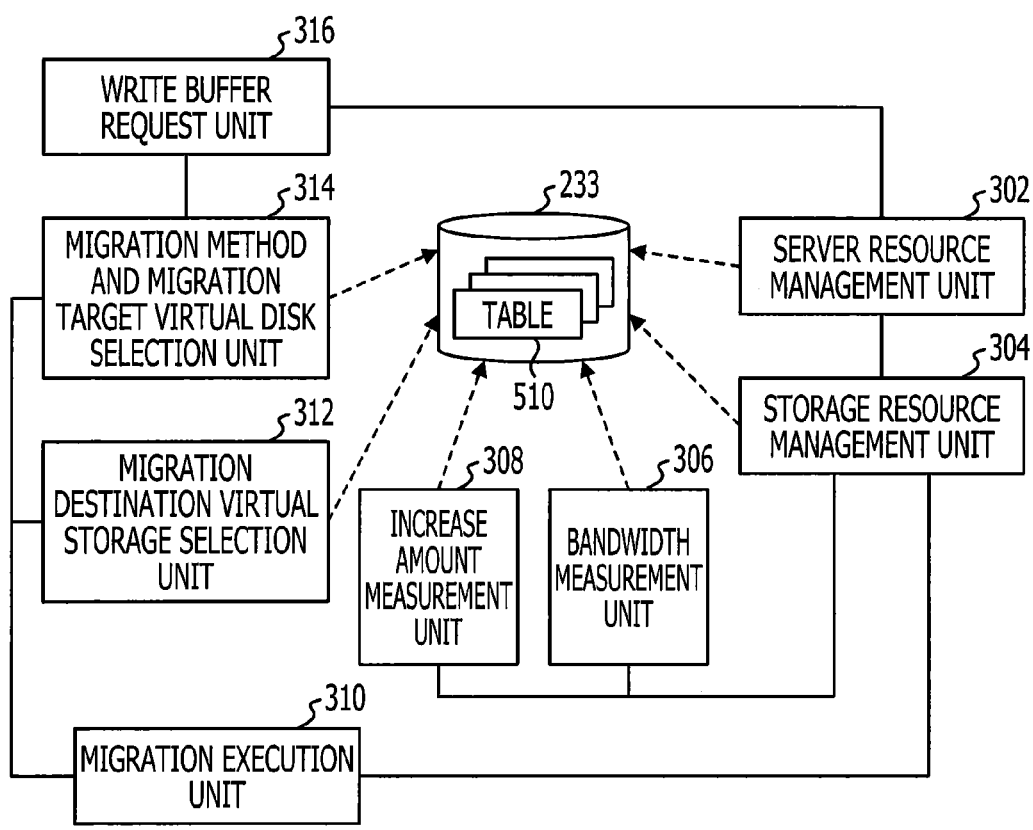
FIG. 4 is a block diagram illustrating an exemplary application program configuration.

FIG. 4 is a functional block diagram illustrating each function when the CPU 221 in the information processing apparatus 200 executes the OS and migration control program 1000. A server resource management unit 302 manages the servers 100. A storage resource management unit 304 creates a virtual storage and a virtual disk in the storage apparatus 400. The storage resource management unit 304 manages the storage resource management table 550. FIG. 5 illustrates the storage resource management table 550. The storage resource management table 550 stores a storage apparatus ID 531, a model name 552, an IP address 542, and a state 545. The storage apparatus ID 531 is information used to identify a storage apparatus. The model name 552 represents the model name of a corresponding storage apparatus. The IP address 542 represents the IP address of the storage apparatus. The state 545 represents the state of the storage apparatus.

A bandwidth measurement unit 306 measures the network bandwidth of the storage apparatus 400. An increase amount measurement unit 308 measures the amount of increase in data stored in the storage apparatus 400 corresponding to a virtual disk and stores the measured amount of increase in the virtual disk management table 510. The virtual disk management table 510 will be described later with reference to FIG. 9. A migration execution unit 310 performs the migration of data from a virtual disk to another virtual disk created in the storage apparatus 400. A virtual disk will be described later. A migration destination virtual storage selection unit 312 selects a virtual storage in which a migration destination virtual disk is to be created. A virtual storage will be described later. A migration method and migration target virtual disk selection unit 314 selects a migration method to be performed and a virtual disk on which migration is to be performed. A write buffer request unit 316 obtains a region to be used as a buffer on a memory in a VM host. A VM host will be described later.

Figure 6:
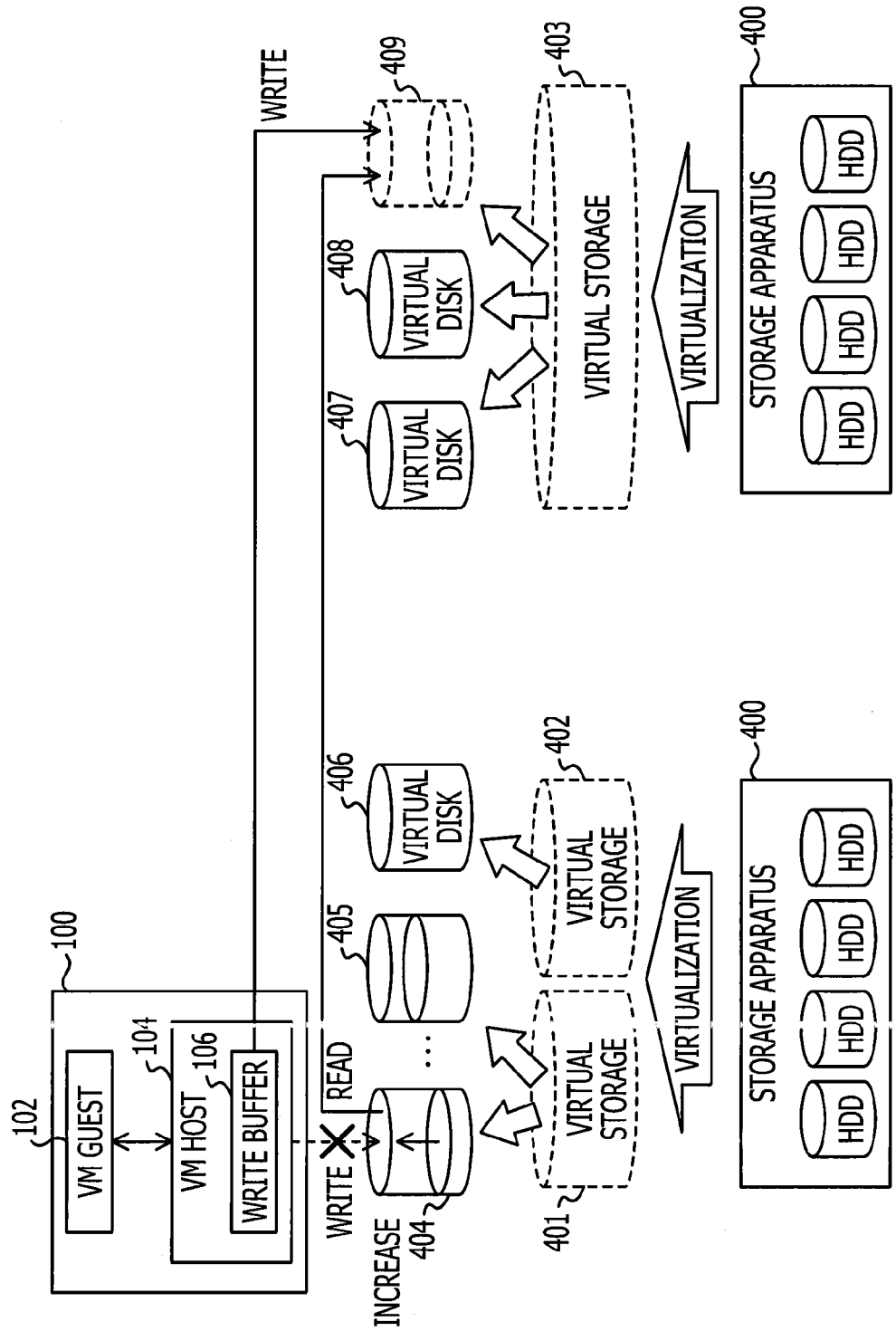
FIG. 6 is a diagram describing virtual disk migration.

FIG. 6 is a diagram describing virtual disk migration according to an embodiment. The storage resource management unit 304 creates virtual storages 401, 402, and 403 in the physical storage apparatuses 400. The storage resource management unit 304 creates virtual disks 404 and 405 in the virtual storage 401, a virtual disk 406 in the virtual storage 402, and virtual disks 407, 408, and 409 in the virtual storage 403.

The CPU 201 in the server 100 executes the VM host image 3000 and the VM guest image 3100, so that a VM host 104 and a VM guest 102 are executed in the server 100. The VM host 104 executes a plurality of VM guests. The VM guest 102 is a virtualized OS. The VM host 104 includes a write buffer 106. The write buffer 106 temporarily stores data transmitted from the VM guest 102.

In an embodiment, it is assumed that the amount of practical use is small and the increase in the amount of practical use is large in the virtual disk 404. The movement of data from the virtual disk 404 to the virtual disk 409 will be described. During the movement of data from the virtual disk 404 to the virtual disk 409, the write buffer 106 temporarily stores data transmitted from the VM guest 102. Since a bandwidth is used for the movement of data from the virtual disk 404 to the virtual disk 409, the copying of the data is completed within a short time. Subsequently, the write buffer 106 moves the temporarily stored data to the virtual disk 409.

For example, a virtual disk whose amount of practical use is equal to or smaller than the minimum value of +250 MB and whose increase in the amount of practical use is equal to or smaller than the maximum value of −100 MB is set as a candidate for a migration source.

Figure 7:
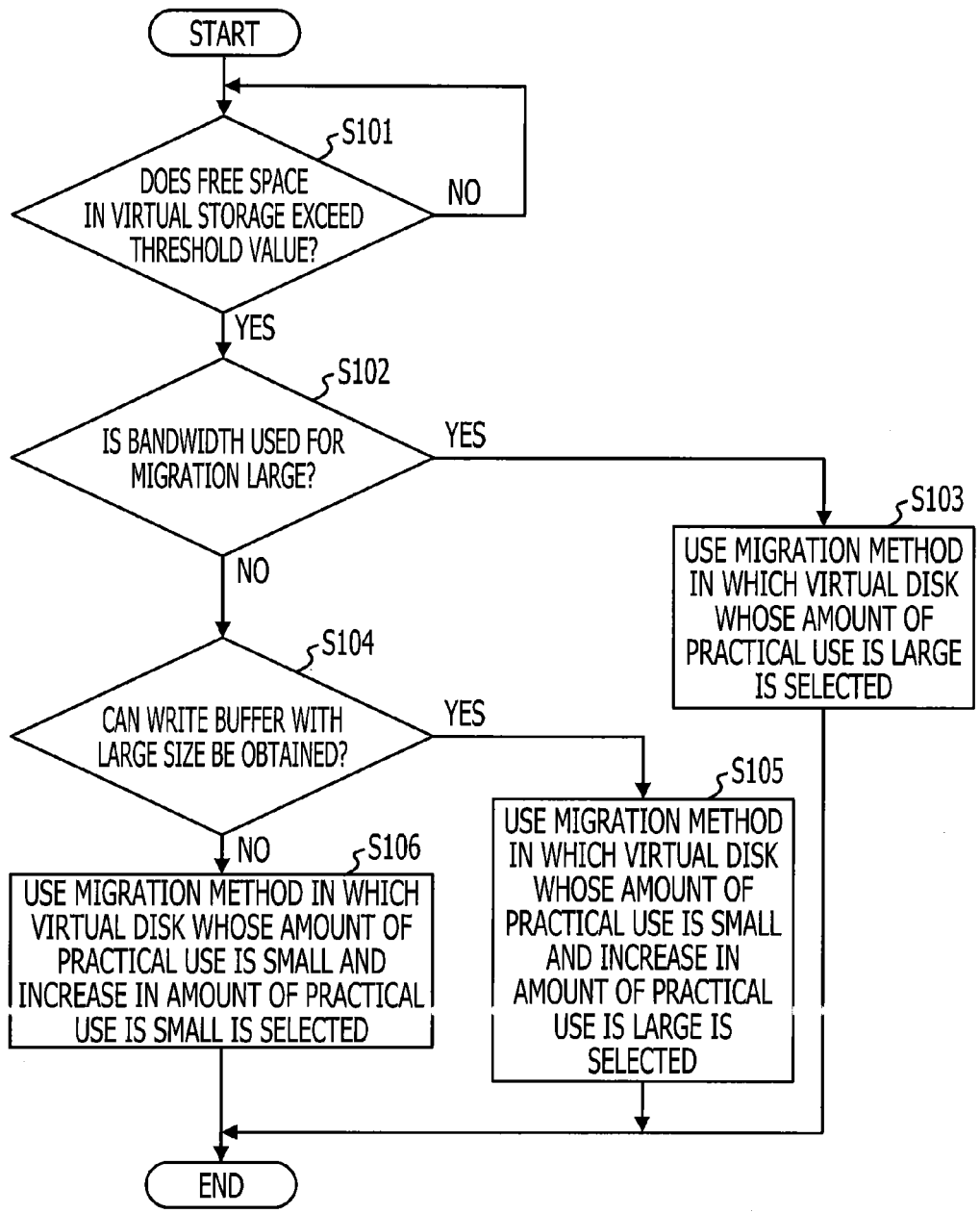
FIG. 7 is a flowchart illustrating a migration method change process.

A migration method change process will be described with reference to FIG. 7. In an embodiment, as a parameter used to change a migration method, a network bandwidth used for migration and the size of a write buffer used during migration are used.

In a case where a network bandwidth used for migration is large (a calculated bandwidth to be consumed for migration ≤ an estimated available bandwidth), a virtual disk whose amount of practical use is large is set as a migration target and both the acquisition of free space in a virtual storage and the reduction in the amount of overcommitment are achieved at the same time. On the other hand, in a case where a network bandwidth used for migration is small (an estimated available bandwidth < a calculated bandwidth to be consumed for migration), a virtual disk whose amount of practical use is small is set as a migration target and the reduction in the amount of overcommitment is achieved.

In a case where the size of a write buffer used during migration is large (a calculated size to be used for migration an acquired size), data to be written into a virtual disk that is a copy source is temporarily stored in the write buffer and is then directly written into a virtual disk that is a copy destination. On the other hand, in a case where the size of a write buffer used during migration is small (an acquired size < a calculated size to be used for migration), it is difficult to temporarily store data to be written into a virtual disk that is a copy source in the write buffer.

In an embodiment, the following migration method change process is performed on the basis of the above-described pieces of information.

In step S101, the migration method and migration target virtual disk selection unit (hereinafter referred to as a method and virtual disk selection unit) 314 determines whether free space in a virtual storage exceeds a threshold value. In a case where free space in the virtual storage exceeds the threshold value, the method and virtual disk selection unit 314 moves the process to step S102. On the other hand, in a case where free space in the virtual storage does not exceed the threshold value, the method and virtual disk selection unit 314 returns the process to step S101.

In step S102, the method and virtual disk selection unit 314 determines whether a bandwidth used for migration is large. This determination will be described in detail later in step S205 in FIG. 8. In a case where a bandwidth used for migration is large, the method and virtual disk selection unit 314 moves the process to step S103. On the other hand, in a case where a bandwidth used for migration is not large, the method and virtual disk selection unit 314 moves the process to step S104.

In step S103, the method and virtual disk selection unit 314 uses a migration method in which a virtual disk whose amount of practical use is large is selected. With this migration method, both the acquirement of free space and the reduction in the amount of overcommitment is achieved at the same time. Subsequently, the method and virtual disk selection unit 314 ends the process.

In step S104, the method and virtual disk selection unit 314 accesses the write buffer request unit 316 to determine whether a write buffer with a large size is obtained. This determination will be described in detail later in step S309 in FIG. 14. In a case where a write buffer with a large size is obtained, the method and virtual disk selection unit 314 moves the process to step S105. On the other hand, in a case where it is difficult to obtain a write buffer with a large size, the method and virtual disk selection unit 314 moves the process to step S106.

In step S105, the method and virtual disk selection unit 314 uses a migration method in which a virtual disk whose amount of practical use is small and the increase in the amount of practical use is large is selected. With this migration method, the reduction in the amount of overcommitment is achieved within a small migration time. Subsequently, the method and virtual disk selection unit 314 ends the process.

In step S106, the method and virtual disk selection unit 314 uses a migration method in which a virtual disk whose amount of practical use is small and the increase in the amount of practical use is small is selected. By performing migration on a plurality of disks whose amount of practical use is small with this migration method, both the acquirement of free space and the reduction in the amount of overcommitment is achieved.

Figure 8:
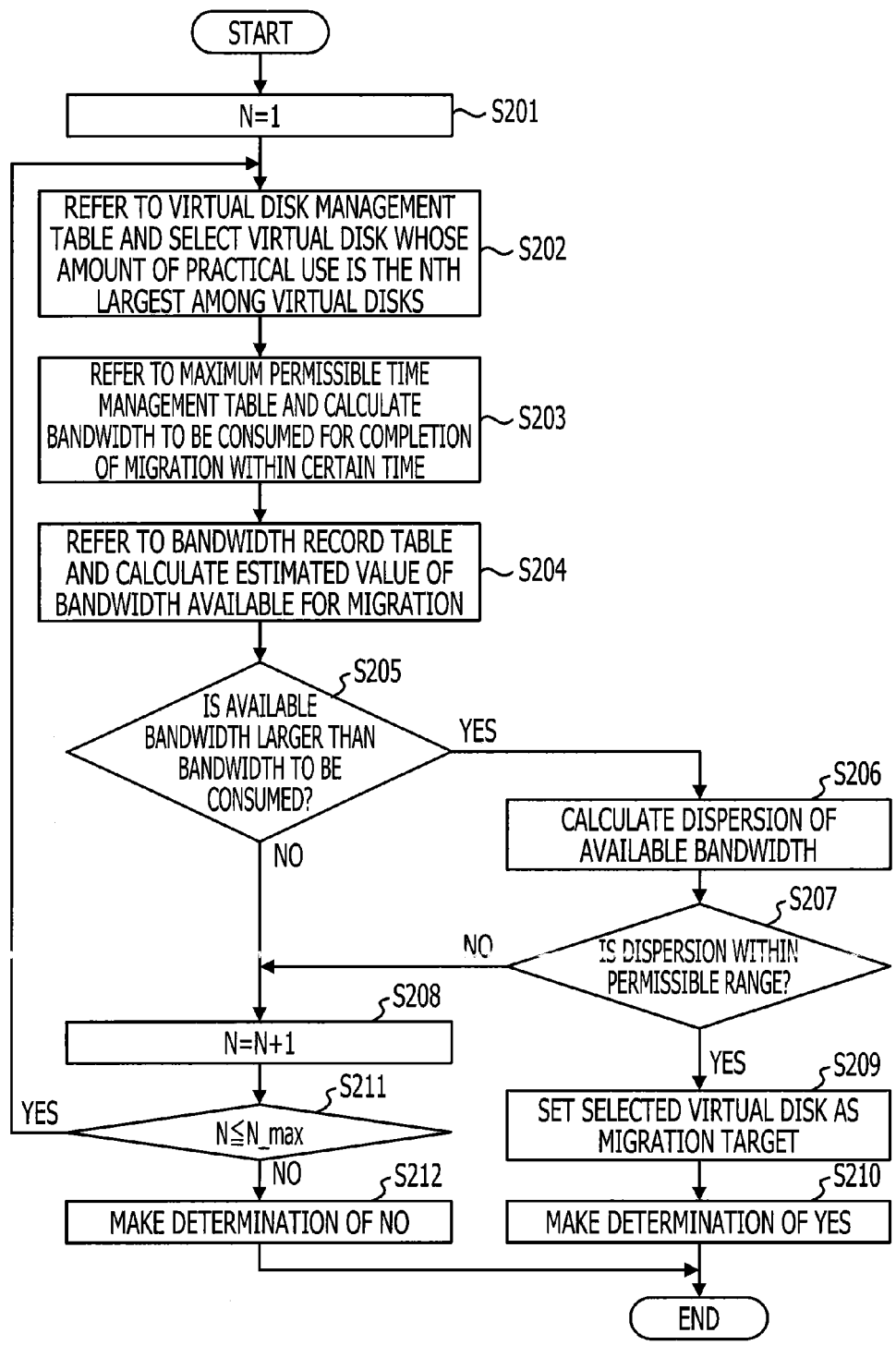
FIG. 8 is a flowchart illustrating a bandwidth determination process.

The bandwidth determination processing in step S102 in FIG. 7 will be described in detail with reference to FIG. 8.

In step S201, the method and virtual disk selection unit 314 sets N to 1. The method and virtual disk selection unit 314 moves the process to step S202.

In step S202, the method and virtual disk selection unit 314 refers to the virtual disk management table 510 and selects a virtual disk whose amount of practical use is the Nth largest among virtual disks.

FIG. 9 illustrates the virtual disk management table 510. The virtual disk management table 510 is created in the hard disk 233 at the time of installation of a migration execution program. The virtual disk management table 510 stores a virtual disk ID 511, a virtual storage ID 512, a capacity 513, the amount of practical use 514, and a history 515. The history 515 includes the amount of increase 516 and a written page number 517. The histories 515 represent intervals at which various pieces of information corresponding to the virtual disk ID 511 are periodically recorded.

The storage resource management unit 304 periodically records a page in a virtual disk on which writing has been performed. The page on which writing has been performed is used for the estimation of the size of a write buffer. Here, a page represents a certain region assigned to a virtual disk.

The storage resource management unit 304 counts the number of pages excluding a duplicate page. For example, it is assumed that the numbers of pages on which writing has been performed at a time t=n are 0, 1, 2, and 7, the numbers of pages on which writing has been performed at a time t=n+1 are 2, 3, and 7, and the numbers of pages on which writing has been performed at a time t=n+2 are 2, 7, and 9. The storage resource management unit 304 determines that the number of pages on which writing has been performed between the time t=n and the time t=n+2 is six (0, 1, 2, 3, 7, and 9). The virtual disk ID 511 is information used to identify a virtual disk. The virtual storage ID 512 is information used to identify a virtual storage. The capacity 513 represents the capacity of the virtual disk. The amount of practical use 514 represents the amount of practical use of the virtual disk. The amount of increase 516 represents the amount of increase in data stored in the virtual disk. The written page number 517 represents the number of a page on which writing has been performed recorded by the storage resource management unit 304.

In an embodiment, a case in which actual free space in a virtual storage VS-001 exceeds a threshold value will be described. The method and virtual disk selection unit 314 selects a virtual disk VDISK_00234 whose amount of practical use is the largest among virtual disks corresponding to the virtual storage ID of VS-001 in the virtual disk management table 510. The bandwidth measurement unit 306 moves the process to step S203 in FIG. 8.

In step S203, the method and virtual disk selection unit 314 refers to a maximum permissible time management table 520 and calculates a bandwidth to be consumed for the completion of migration within a certain time.

FIG. 10 illustrates the maximum permissible time management table 520. The maximum permissible time management table 520 stores a disk size 521 and a maximum permissible time 522. The disk size 521 represents the size of a virtual disk. The maximum permissible time 522 represents the maximum time permissible in moving data.

The bandwidth measurement unit 306 calculates a bandwidth to be consumed for migration on the basis of the maximum permissible time with Equation 1 where $B_{req}$ represents a bandwidth to be consumed, $D_{size}$ represents a disk size, and $T_{exp}$ represents the maximum permissible time.

$$B_{req}=D_{slice}/T_{exp} \quad (1)$$

The method and virtual disk selection unit 314 calculates the maximum permissible time for the virtual disk VDISK_00234 (whose amount of practical use is 700 GB) with the maximum permissible time management table 520. The method and virtual disk selection unit 314 obtains 24 hours (500 GB)+5 hours (100 GB)×2=34 hours as a result of the calculation. The method and virtual disk selection unit 314 obtains 45.8 MBps as a bandwidth to be consumed with Equation 1. The method and virtual disk selection unit 314 moves the process to step S204 in FIG. 8.

In step S204, the method and virtual disk selection unit 314 refers to a bandwidth record table 530 and calculates an estimated value of a bandwidth available for migration.

FIG. 11 illustrates the bandwidth record table 530. The bandwidth record table 530 stores the storage apparatus ID 531, a bandwidth 532, a first history 5331, a second history 5332, a third history 5333, and an nth history 533n. The bandwidth measurement unit 306 records the maximum value, the minimum value, and the median value of the network bandwidth of a storage apparatus. In a case where the change in the network bandwidth is large, the method and virtual disk selection unit 314 determines that it is difficult to stably use the bandwidth. That is, it is determined that a current state is not suitable for migration performed on a virtual disk whose amount of practical use is large with a large network bandwidth. The method and virtual disk selection unit 314 calculates the range of variation in a network bandwidth (dispersion of a network bandwidth), and determines that a current state is unstable when the range of variation exceeds, for example, an average value of ±30%. The storage apparatus ID 531 is information used to identify a storage apparatus. The bandwidth 532 represents the maximum value, the median value, and the minimum value of a network bandwidth. Each of the first history 5331, the second history 5332, and the likes represents a past network bandwidth.

The method and virtual disk selection unit 314 calculates an estimated value of an available bandwidth on the basis of past data with Equation 2 where n represents the number of record cycles, t represents polling intervals (minutes in a single cycle), $B_{ave}$ represents a bandwidth average value, and $b_m$ represents the median value of a bandwidth at a time t.

$$n=T_{exp}/t, B_{ave}=\Sigma_{t=-(n-1),0} b_m/n \quad (2)$$

The method and virtual disk selection unit 314 refers to a virtual storage management table 560 illustrated in FIG. 12 and determines that the virtual storage VS-001 is included in a storage apparatus PSU-001.

The virtual storage management table 560 stores the virtual storage ID 512, the storage apparatus ID 531, an actual maximum capacity 563, a permissible amount of overcommitment 564, a reserved capacity 565, free space 566, the amount of practical use 514, and actual free space 568. The virtual storage ID 512 is information used to identify a virtual storage. The storage apparatus ID 531 is information used to identify a storage apparatus. The actual maximum capacity 563 represents the actual capacity of the virtual storage. The permissible amount of overcommitment 564 represents the permissible amount of overcommitment for the virtual storage. The reserved capacity 565 represents a capacity committed for a user. The free space 566 represents free space in the virtual storage. The amount of practical use 514 represents the amount of practical use of the virtual storage. The actual free space 568 represents actual free space in the virtual storage.

FIG. 13 illustrates a threshold value table 570. The threshold value table 570 stores the virtual storage ID 512 and an actual free space threshold value 572. The virtual storage ID 512 is information used to identify a virtual storage. The actual free space threshold value 572 represents a threshold value of actual free space in the virtual storage.

The method and virtual disk selection unit 314 refers to the bandwidth record table 530 and calculates an estimated value of an available bandwidth. Here, it is assumed that a bandwidth information collection cycle is 10 minutes and pieces of data collected in the latest 100 hours (the number of histories is 600) are recorded. The method and virtual disk selection unit 314 calculates the average of median values in the latest 204 histories (34 hours=the maximum permissible time) with Equation 2. The method and virtual disk selection unit 314 moves the process to step S205 in FIG. 8.

In step S205, the method and virtual disk selection unit 314 determines whether the available bandwidth is larger than a bandwidth to be consumed (the available bandwidth > the bandwidth to be consumed). In a case where the available bandwidth is larger than the bandwidth to be consumed, the method and virtual disk selection unit 314 moves the process to step S206. On the other hand, in a case where the available bandwidth is not larger than the bandwidth to be consumed (the available bandwidth the bandwidth to be consumed), the method and virtual disk selection unit 314 moves the process to step S208.

Since the method and virtual disk selection unit 314 determine that the virtual storage VS-001 is included in the storage apparatus PSU-001 with the virtual storage management table 560, it estimates an available bandwidth with the bandwidth record table 530. Here, it is assumed that a bandwidth information collection cycle is 10 minutes and pieces of data in the latest 100 hours (the number of histories is 600) are recorded. The method and virtual disk selection unit 314 calculates the average of the latest 204 (34 hours=the maximum permissible time) mean values with Equation 2. The method and virtual disk selection unit 314 determines whether a calculation result of Equation 2 is equal to or larger than 45.8 that is a calculation result of Equation 1.

In step S206, the method and virtual disk selection unit 314 calculates the dispersion of an available bandwidth with Equation 3 where $B_{var}$ represents the dispersion of a bandwidth. The method and virtual disk selection unit 314 moves the process to step S207.

$$B_{var} \Sigma_{t=-(n-1),0} b_m^2/n - (\Sigma_{t=-(n-1),0} b_m/n)^2 \quad (3)$$

In step S207, the method and virtual disk selection unit 314 determines whether the dispersion is within a permissible range. The permissible range is a permissible network bandwidth variation range. In a case where the dispersion is within the permissible range, the method and virtual disk selection unit 314 moves the process to step S209. On the other hand, in a case where the dispersion is not within the permissible range, the method and virtual disk selection unit 314 moves the process to step S208.

The method and virtual disk selection unit 314 refers to the bandwidth record table 530, calculates the dispersion of the median values from the latest 204 histories, and determines whether the dispersion is within a range (for example ±30%) set in advance by an administrator.

In step S209, since a calculation result of Equation 3 is within the range set in advance, the method and virtual disk selection unit 314 sets the selected virtual disk VDISK 00234 as a migration target. The method and virtual disk selection unit 314 moves the process to step S210.

In step S210, the method and virtual disk selection unit 314 makes a determination of YES. The method and virtual disk selection unit 314 ends the process illustrated in FIG. 8. In step S102 illustrated in FIG. 7, the method and virtual disk selection unit 314 moves the process to step S103.

In step S208, the method and virtual disk selection unit 314 increments N by one. The method and virtual disk selection unit 314 moves the process to step S211.

In a case where a calculation result of Equation 2 is smaller than a calculation result of Equation 1 (45.8 in this example) and a calculation result of Equation 3 is outside the range set in advance (±30% in this example), the method and virtual disk selection unit 314 repeatedly performs the above-described determination on a virtual disk whose amount of practical use is the second largest until N reaches the maximum value N_max set in advance by an administrator. In an embodiment, the method and virtual disk selection unit 314 performs the above-described determination on the virtual disks VDISK_06463 (320 GB) and VDISK_00001 (2 GB) in this order.

In step S211, the method and virtual disk selection unit 314 determines whether N is equal to or smaller than the maximum value set in advance by an administrator. In a case where N is equal to or smaller than the maximum value, the method and virtual disk selection unit 314 moves the process to step S202. On the other hand, in a case where N is not equal to or smaller than the maximum value, the method and virtual disk selection unit 314 determines that this state is not suitable for migration performed on a virtual disk whose amount of practical use is large because the number of repetitions has reached the maximum value. The method and virtual disk selection unit 314 moves the process to step S212.

In step S212, the method and virtual disk selection unit 314 makes the determination of NO. In step S102 illustrated in FIG. 7, the method and virtual disk selection unit 314 moves the process to step S104.

Figure 14:
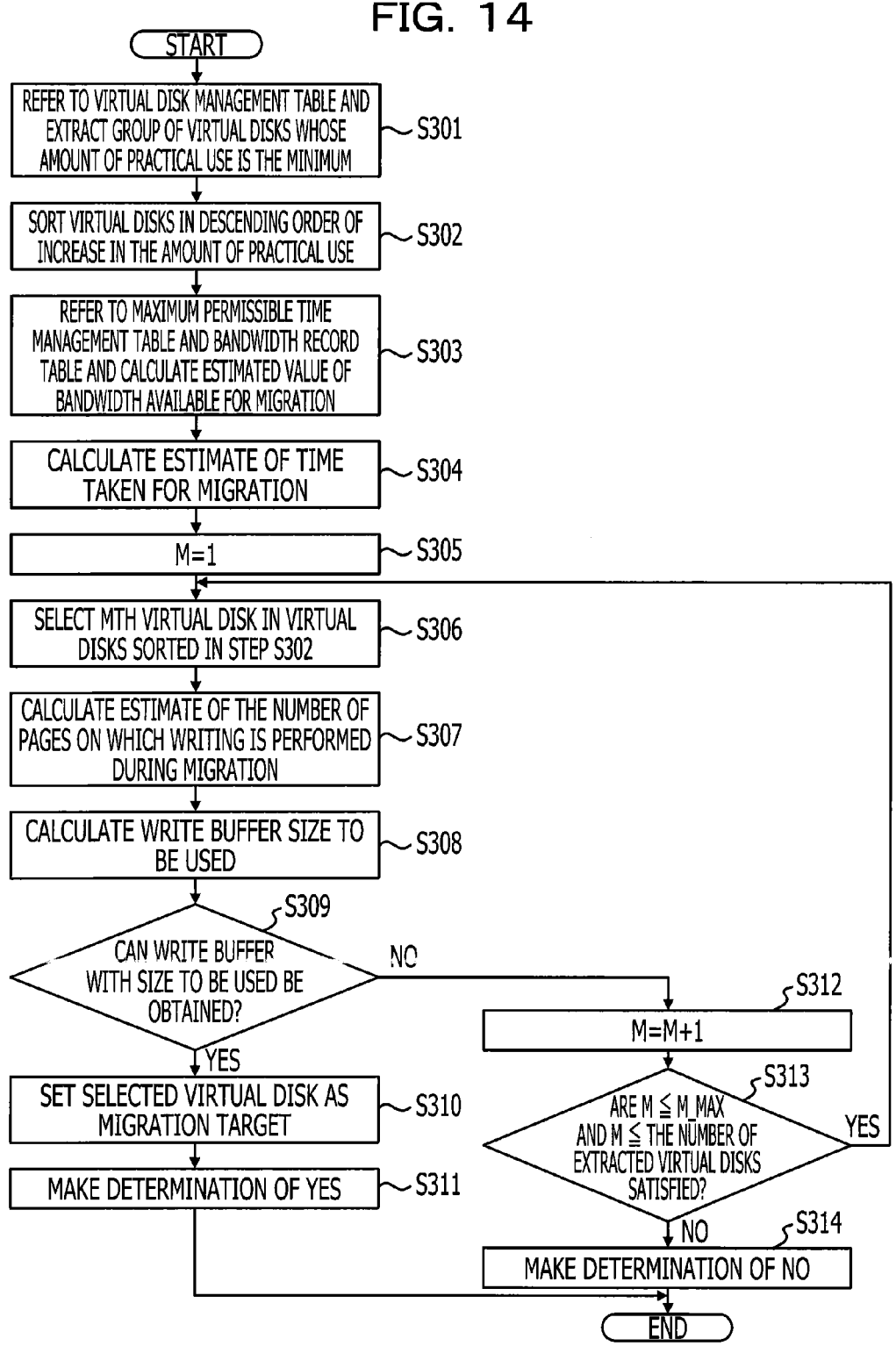
FIG. 14 is a flowchart illustrating a buffer size determination process.

The size determination processing in step S104 in FIG. 7 will be described in detail with reference to FIG. 14.

In step S301, the method and virtual disk selection unit 314 refers to the virtual disk management table 510 and extracts a group of virtual disks whose amount of practical use is the minimum.

In an embodiment, a single virtual disk VDISK_0001 whose amount of practical use is the minimum (2 GB) is extracted. The method and virtual disk selection unit 314 moves the process to step S302.

In step S302, the method and virtual disk selection unit 314 sorts the group of virtual disks extracted in step S301 in descending order of the increase in the amount of practical use.

In an embodiment, the increase in the amount of practical use of a virtual disk and the number of a written page are collected every one minute, and pieces of data (the number of histories is 60) collected in the latest one hour are recorded in the virtual disk management table 510. In a case where a plurality of virtual disks are extracted, the method and virtual disk selection unit 314 calculates an increase amount average value of a certain number of histories (for example ten histories) for each of the virtual disks and sorts the virtual disks in descending order of increase amount average value. The method and virtual disk selection unit 314 moves the process to step S303.

In step S303, the method and virtual disk selection unit 314 refers to the maximum permissible time management table 520 and the bandwidth record table 530 and calculates an estimated value of a bandwidth available for migration. The method and virtual disk selection unit 314 calculates an estimated value of an available bandwidth on the basis of past data with Equation 2.

The method and virtual disk selection unit 314 refers to the maximum permissible time management table 520 and calculates the permissible maximum time taken for migration performed on the virtual disk VDISK_00001 (2 GB). In an embodiment, the permissible maximum time is 2 minutes (1 GB)×2=4 minutes. Since the method and virtual disk selection unit 314 determines that the virtual storage VS-001 is included in the storage apparatus PSU-001 by referring to the virtual storage management table 560, it calculates an estimated value of an available bandwidth with the bandwidth record table 530. The method and virtual disk selection unit 314 calculates an average of median values in the latest one history (the minimum number of information collection cycles equal to or longer than the maximum permissible time) with Equation 2. In an embodiment, the method and virtual disk selection unit 314 obtains 70.8 MBps from the latest data included in the first history as an estimated value of an available bandwidth. The method and virtual disk selection unit 314 moves the process to step S304.

In step S304, the method and virtual disk selection unit 314 calculates an estimate of a time taken for migration.

The method and virtual disk selection unit 314 calculates an estimate of a time taken for migration on the basis of the value of an available bandwidth with Equation 4 where $T_{req}$ represents a time taken for migration.

$$T_{req}=D_{size}/B_{ave} \qquad (4)$$

The method and virtual disk selection unit 314 calculates a time taken for migration performed on the virtual disk VDISK_00001 with Equation 4. In an embodiment, the method and virtual disk selection unit 314 obtains 226 seconds as a time taken for migration. The method and virtual disk selection unit 314 moves the process to step S305 in FIG. 14.

In step S305, the method and virtual disk selection unit 314 sets M to 1. The method and virtual disk selection unit 314 moves the process to step S306.

In step S306, the method and virtual disk selection unit 314 selects the Mth virtual disk in the extracted group of virtual disks. The method and virtual disk selection unit 314 moves the process to step S307.

In step S307, the method and virtual disk selection unit 314 calculates an estimate of the number of pages on which writing is performed during migration.

The method and virtual disk selection unit 314 calculates an estimate of the number of pages on which writing is performed during migration with Equation 5 where $P_n$ represents an estimate of the number of pages on which writing is performed during migration and $P_w$ represents the list of pages on which writing has been performed at a time t. The method and virtual disk selection unit 314 moves the process to step S308 in FIG. 14.

$$P_n = \cap_{t-(T_{req}-1),t} P_w \qquad (5)$$

The method and virtual disk selection unit 314 refers to the written page number 517 in the history 515 in the virtual disk management table 510 and calculates an estimate of the number of pages on which writing is performed within the time taken for migration with Equation 5. In an embodiment, the method and virtual disk selection unit 314 refers to the latest one history (the minimum number of information collection cycles equal to or longer than the time taken for migration) of the virtual disk VDISK_00001 and obtains 7 pages as an estimate of the number of pages.

In step S308, the method and virtual disk selection unit 314 calculates a write buffer size to be used.

The method and virtual disk selection unit 314 calculates a buffer size to be used with Equation 6 where $W_{size}$ represents the size of a write buffer and $P_{size}$ represents the size of a page.

$$W_{size}=P_n \cdot p_{size} \qquad (6)$$

In an embodiment, under the assumption that the size of a page is 8 KB, the method and virtual disk selection unit 314 obtains 8×7=56 KB as a result of the calculation of a buffer size to be used. The method and virtual disk selection unit 314 moves the process to step S309 in FIG. 14.

In step S309, the method and virtual disk selection unit 314 accesses the write buffer request unit 316. The write buffer request unit 316 determines whether a write buffer having the size to be used is obtained and notifies the method and virtual disk selection unit 314 of a result of the determination. In a case where a write buffer having the size to be used is obtained, the method and virtual disk selection unit 314 moves the process to step S310. On the other hand, in a case where it is difficult to obtain a write buffer having the size to be used, the method and virtual disk selection unit 314 moves the process to step S312.

In step S310, the method and virtual disk selection unit 314 sets the selected virtual disk as a migration target. The method and virtual disk selection unit 314 moves the process to step S311.

In step S311, the method and virtual disk selection unit 314 makes the determination of YES. In step S104 illustrated in FIG. 7, the method and virtual disk selection unit 314 moves the process to step S105. The process ends.

In step S312, the method and virtual disk selection unit 314 increments M by one. The method and virtual disk selection unit 314 moves the process to step S313.

In step S313, the method and virtual disk selection unit 314 determines whether M is equal to or smaller than the maximum value M_max set in advance by an administrator and the number of extracted virtual disks. In a case where M is equal to or smaller than the maximum value and the number of extracted virtual disks, the method and virtual disk selection unit 314 moves the process to step S306. The method and virtual disk selection unit 314 repeatedly performs the same process on the candidate virtual disks in the order of sorting. On the other hand, in a case where M is not equal to or smaller than the maximum value and the number of extracted virtual disks, the method and virtual disk selection unit 314 moves the process to step S314.

In step S314, since a write buffer having the size to be used has not been obtained in all of the candidate virtual disks, the method and virtual disk selection unit 314 makes the determination of NO. In step S104 illustrated in FIG. 7, the method and virtual disk selection unit 314 moves the process to step S106. The process ends.

Figure 15:
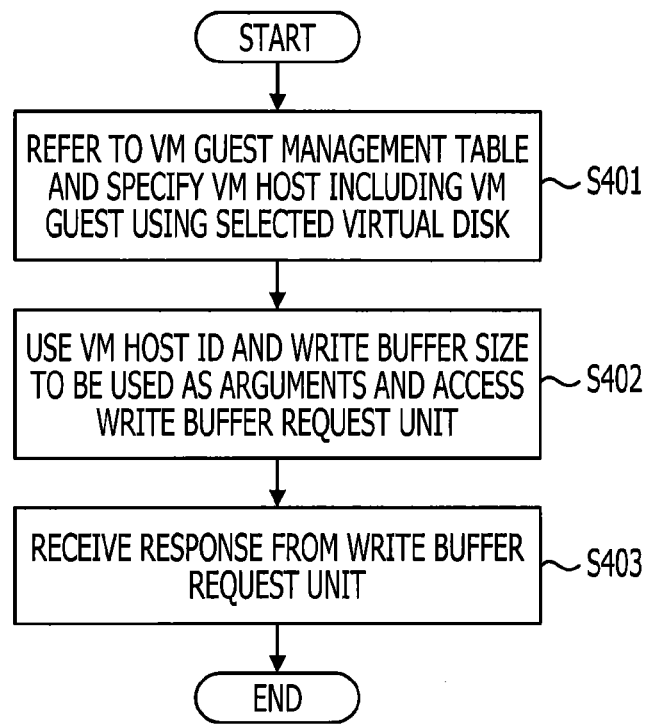
FIG. 15 is a flowchart illustrating a process performed by a migration method and migration target virtual disk selection unit.

A process performed by the method and virtual disk selection unit 314 will be described with reference to FIG. 15.

In step S401, the method and virtual disk selection unit 314 refers to a VM guest management table 540 and specifies a VM host including a VM guest that uses the selected virtual disk.

FIG. 17 illustrates the VM guest management table 540. The VM guest management table 540 stores a VM guest ID 541, an IP address 642, a CPU 543, a memory 544, the state 545, a VM host ID 546, and a used virtual disk 547. The VM guest ID 541 is information used to identify a VM guest. The IP address 642 represents an IP address corresponding to the VM guest. The CPU 543 represents the operation frequency of a CPU corresponding to the VM guest. The memory 544 represents the capacity of a memory corresponding to the VM guest. The state 545 represents the state of the VM guest. The VM host ID 546 is information used to identify a VM host. The used virtual disk 547 represents a used virtual disk.

The method and virtual disk selection unit 314 refers to the used virtual disk 547 in the VM guest management table 540 and searches for a VM guest that uses the virtual disk VDISK_0001. In an embodiment, a VM guest VM-001 is obtained as a search result. Subsequently, the method and virtual disk selection unit 314 refers to a VM guest 587 in a VM host management table 580 and searches for a VM host including the VM guest VM001. In an embodiment, a VM host VH-001 is obtained as a search result.

FIG. 18 illustrates the VM host management table 580. The VM host management table 580 stores the VM host ID 546, an IP address 742, a CPU 643, a memory 644, a state 645, a used virtual storage 586, and the VM guest 587. The VM host ID 546 is information used to identify a VM host. The IP address 742 represents an IP address corresponding to the VM host. The CPU 643 represents the operation frequency of a CPU corresponding to the VM host and the number of the CPUs. The memory 644 represents the capacity of a memory corresponding to the VM host. The state 645 represents the state of the VM host. The used virtual storage 586 represents a used virtual storage. The VM guest 587 represents the identification information of a VM guest corresponding to the VM host. The method and virtual disk selection unit 314 moves the process to step S402 in FIG. 15.

In step S402, the method and virtual disk selection unit 314 uses the VM host ID and the write buffer size to be used as arguments and accesses the write buffer request unit 316 with them.

The method and virtual disk selection unit 314 uses the VM host ID of VH-001 and the write buffer size to be used of 56 KB as arguments and accesses the write buffer request unit 316. The method and virtual disk selection unit 314 moves the process to step S403.

In step S403, the method and virtual disk selection unit 314 receives a response from the write buffer request unit 316. The process in FIG. 15 ends.

Figure 16:
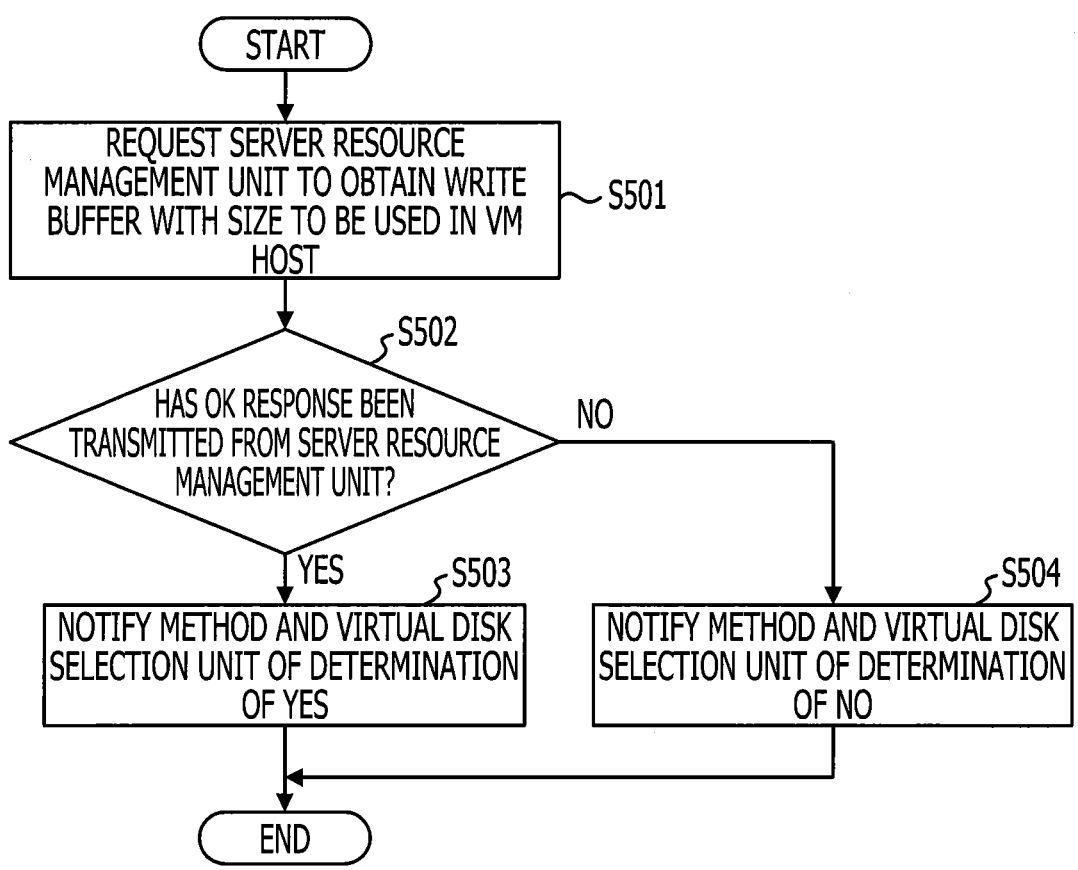
FIG. 16 is a flowchart illustrating a write buffer request process.

The process performed by the write buffer request unit 316 accessed in step S402 will be described in detail with reference to FIG. 16. In step S501, the write buffer request unit 316 requests the server resource management unit 302 to obtain a write buffer with the size to be used in the VM host.

The write buffer request unit 316 requests the server resource management unit 302 to obtain a memory region having the size of 56 KB in the VM host VH-001. The write buffer request unit 316 moves the process to step S502.

In step S502, the write buffer request unit 316 determines whether an OK response has been received from the server resource management unit 302. In a case where the OK response has been received from the server resource management unit 302, the write buffer request unit 316 moves the process to step S503. In a case where the OK response has not been received from the server resource management unit 302, the write buffer request unit 316 moves the process to step S504.

In step S503, the write buffer request unit 316 notifies the method and virtual disk selection unit 314 of the determination of YES. The process ends.

In step S504, the write buffer request unit 316 notifies the method and virtual disk selection unit 314 of the determination of NO. The process ends.

Through the above-described process, the method and virtual disk selection unit 314 selects a migration method and a migration target virtual disk. Subsequently, the method and virtual disk selection unit 314 instructs the migration destination virtual storage selection unit 312 to select a virtual storage in which the virtual disk is to be migrated.

The migration destination virtual storage selection unit 312 refers to the virtual storage management table 560 and the bandwidth record table 530, selects a virtual storage in which the virtual disk is to be migrated on the basis of free space in a virtual storage and the I/O performance of a storage apparatus, and notifies the method and virtual disk selection unit 314 of the selected virtual storage. This process may be performed with conventional technologies, and the detailed description thereof will be omitted.

The method and virtual disk selection unit 314 instructs the migration execution unit 310 to migrate the selected virtual disk to the virtual storage selected as a migration destination.

The migration execution unit 310 performs the migration of the virtual disk. This processing may be performed with conventional technologies, and the detailed description thereof will be omitted.

According to an embodiment, in a case where it is detected that free space in a virtual storage has exceeded a certain value, an optimum migration method is automatically selected, and data stored in a virtual disk whose increase in the amount of practical use is equal to or larger than a threshold value is moved to a virtual disk created in another virtual storage. As a result, the I/O load of a storage apparatus is reduced.

An information processing system according to an exemplary embodiment of the present disclosure has been described. However, the present disclosure is not limited to the embodiment and various modifications and various changes are made without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method comprising:
    allocating a plurality of virtual disks to a virtual storage allocated to a physical storage;
    associating data with one of the plurality of virtual disks which has been instructed to store the data and storing the data in the physical storage;
    calculating an available buffer size of a write buffer; and
    selecting, by a processor, one of the plurality of virtual disks as a data movement target virtual disk from which data is to be moved in accordance with the calculated buffer size when free space in the virtual storage exceeds a threshold value,
    wherein, when the calculated buffer size is larger than a certain size, at least one of the plurality of virtual disks whose amount of practical use is smaller than a certain amount and whose increase in data storage capacity is larger than a certain value is selected as the data movement target virtual disk, and
    wherein, when the calculated buffer size is smaller than the certain size, at least one of the plurality of virtual disks whose amount of practical use is smaller than the certain amount and whose increase in data storage capacity is smaller than the certain value is selected as the data movement target virtual disk.

2. The control method according to claim 1,
    wherein, when a network bandwidth of the physical storage is larger than a certain bandwidth, at least one of the plurality of virtual disks whose amount of practical use is larger than a certain amount is selected as the data movement target virtual disk, and
    wherein, when the network bandwidth of the physical storage is smaller than the certain bandwidth, the available buffer size is calculated.

3. The control method according to claim 1, wherein the network bandwidth is calculated based on a capacity of the virtual disk and a data movement permissible time.

4. The control method according to claim 1, wherein the buffer size is calculated based on the number of regions storing data in the virtual disk and a size of the stored data.

5. A non-transitory computer-readable recording medium having stored therein a program for causing a computer to execute a digital signature process comprising:
    allocating a plurality of virtual disks to a virtual storage allocated to a physical storage;

associating data with one of the plurality of virtual disks which has been instructed to store the data and storing the data in the physical storage;

calculating an available buffer size of a write buffer: and selecting one of the plurality of virtual disks as a data movement target virtual disk from which data is to be moved in accordance with the calculated buffer size when free space in the virtual storage exceeds a threshold value, wherein the selecting selects, when the calculated buffer size is larger than a certain size, at least one of the plurality of virtual disks whose amount of practical use is smaller than a certain amount and whose increase in data storage capacity is larger than a certain value as the data movement target virtual disk, and the selecting selects, when the calculated buffer size is smaller than the certain size, at least one of the plurality of virtual disks whose amount of practical use is smaller than the certain amount and whose increase in data storage capacity is smaller than the certain value as the data movement target virtual disk.

6. The non-transitory computer-readable recording medium according to claim 5, wherein the digital signature process comprises:

selecting, when a network bandwidth of the physical storage is larger than a certain bandwidth, at least one of the plurality of virtual disks whose amount of practical use is larger than the certain amount as the data movement target virtual disk, and calculating, when the network bandwidth of the physical storage is smaller than the certain bandwidth, the available buffer size.

7. The non-transitory computer-readable recording medium according to claim 5, wherein the digital signature process comprises:

executing calculating the network bandwidth based on a capacity of the virtual disk and a data movement permissible time.

8. The non-transitory computer-readable recording medium according to claim 5, wherein the digital signature process comprises:

executing calculating the buffer size based on the number of regions storing data in the virtual disk and a size of the stored data.

9. An information processing apparatus comprising:

a physical storage that stores data; and a processor that allocates a plurality of virtual disks to a virtual storage allocated to the physical storage, associates data with one of the plurality of virtual disks which has been instructed to store the data and store the data in the physical storage, calculates an available buffer size of a write buffer, and selects one of the plurality of virtual disks as a data movement target virtual disk from which data is to be moved in accordance with the buffer size when free space in the virtual storage exceeds a threshold value, wherein, when the calculated buffer size is larger than a certain size, the processor selects at least one of the plurality of virtual disks whose amount of practical use is smaller than a certain amount and whose increase in data storage capacity is larger than a certain value as the data movement target virtual disk, and when the calculated buffer size is smaller than the certain size, the processor selects at least one of the plurality of virtual disks whose amount of practical use is smaller than the certain amount and whose increase in data storage capacity is smaller than the certain value as the data movement target virtual disk.

10. The information processing apparatus according to claim 9, wherein, when a network bandwidth of the physical storage is larger than a certain bandwidth, the processor selects at least one of the plurality of virtual disks whose amount of practical use is larger than the certain amount as the data movement target virtual disk, wherein, when the network bandwidth of the physical storage is smaller than the certain bandwidth, the processor calculates the available buffer size.

11. The information processing apparatus according to claim 9, wherein the processor calculates the network bandwidth based on a capacity of the virtual disk and a data movement permissible time.

12. The information processing apparatus according to claim 9, wherein the processor calculates the buffer size based on the number of regions storing data in the virtual disk and a size of the stored data.

* * * * *

UNITED STATES PATENT AND TRADEMARK OFFICE
CERTIFICATE OF CORRECTION

PATENT NO. : 8,935,501 B2  
APPLICATION NO. : 13/546669  
DATED : January 13, 2015  
INVENTOR(S) : Soichi Shigeta It is certified that error appears in the above-identified patent and that said Letters Patent is hereby corrected as shown below:

In the Claims

Column 14, Line 52, In Claim 2, delete "larger than a" and insert -- larger than the --, therefor.

Column 15, line 4, In Claim 5, delete "write buffer:" and insert -- write buffer; --, therefor.

Signed and Sealed this
Fifth Day of May, 2015

Michelle K. Lee
*Director of the United States Patent and Trademark Office*